United States Patent Office 3,560,613
Patented Feb. 2, 1971

3,560,613
STABILIZATION OF PYRETHROID COMPOSITIONS
Raymond P. Miskus, Orinda, and Theresa Litwin Andrews, Oakland, Calif., assignors to the United States of America as represented by the Secretary of Agriculture
No Drawing. Filed May 9, 1967, Ser. No. 637,065
Int. Cl. A01n 9/08
U.S. Cl. 424—174                                13 Claims

ABSTRACT OF THE DISCLOSURE

Pyrethroids, useful as insecticides, are stabilized against deterioration by air and sunlight by incorporating in a liquid petrolatum solution thereof (1) from 0% to 5% of a photo-stable, ultraviolet absorbent compound having a log molar extinction coefficient of not less than about 3.0 in the range of about from 2,000 to 3,200 angstrom units and not more than about 2.0 in the range of about from 4,000 to 7,000 angstrom units, such as amyl para-dimethylaminobenzoate, and (2) from 0% to 5% of an antioxidant, such as 2,6-di-tert butyl para-cresol.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to the stabilization of insecticides. More particularly, it relates to the stabilization of pyrethroids against the deteriorative effects of light and air.

This application is related to the copending application of Miskus et al. entitled "Stabilization of Pyrethrum Compositions," Ser. No. 518,534, filed Jan. 4, 1966, now abandoned.

The term "pyrethroids," as used herein, includes both the natural insecticidal components of pyrethrum flowers and those synthetic compounds having pyrethrum-like activity toward insects, such as allethrin and other unsaturated cyclopropane carboxylic acid esters. It is known that the principal active ingredients of pyrethrum flowers are the unsaturated esters of chrysanthemumic acid, designated as pyrethrin I, pyrethrin II, cinerin I and cinerin II.

Pyrethroid insecticidal compositions have been used for many years to control common household pests, such as the housefly and mosquito. Their popularity stems from their rapid knockdown of these insects and from their low toxicity to warm-blooded animals. However, these desirable properties are to some extent offset by a rapid loss of potency when compositions containing the pyrethroids are exposed to sunlight.

Although attempts have been made to stabilize pyrethroids to increase the duration of their effectiveness, the results have not been entirely satisfactory and have fallen short of expectations. For example, United States Patent No. 2,421,223 discloses the additions to a pyrethrum-containing composition of a 2,4,6-trialkylphenol antioxidant, such as 2,4,6-tri-tert.-butylphenol or 2,6-di-tert.-butyl-4-methylphenol. In United States Patent No. 2,772,198 there is disclosed the addition of the amine antioxidant, 4-aminoazobenzene. The latter compound, incidentally, is strongly suspected of having carcinogenic properties. A third suggested method was disclosed by Goldberg et al. in Patent No. 3,063,893. According to that method, pyrethrum extracts can be stabilized by the addition of certain food dyes, such as Food Yellow 10 (Colour Index No. 11,380), which is 1-phenyl-azo-2-amino or Food Orange 3 (Colour Index No. 11,920), which is 2,4-dihydroxyazobenzene. However, the best results obtained by means of these dyes were on the order of 50 percent protection. Furthermore, Orange 3 is no longer used as a food dye and has been difficult to obtain in the United States for that reason. Of even greater concern are the staining characteristics of the stabilizers mentioned by Goldberg et al. which make their pyrethrum compositions entirely unsuitable for household use. It is, therefore, a principal object of the present invention to provide an improved method for stabilizing pyrethroids against the deteriorative effects of sunlight. Another object is to provide pyrethroid compositions of low tinctorial power which retain their effectiveness for as long as or longer than the highly tinctorial compositions disclosed by Goldberg et al. The attainment of these and other objects of the invention will become apparent on the further reading of this specification and the claims.

In general, in accordance with the present invention, we have found that marked protection of pyrethroids against deterioration caused by air and sunlight, at least as great as that provided by the additives of Goldberg et al., is obtained by the use of low tinctorial, photostable, ultraviolet absorbent compounds having a log molar extinction coefficient of not less than about 3.0 in the range of about from 2,900 to 3,200 angstrom units and of not more than about 2.0 in the range of about from 4,000 to 7,000 angstrom units. The log molar extinction coefficient, as is well known (see for example, Landolt-Bornstein, 6th edition, vol. I, Part 3, page 78), is defined by the expression:

$$\log \Sigma = \log \left[ \frac{\log \frac{(I_0)}{(I_D)}}{cd} \right]$$

Where $I_0$ is the intensity of the entering lightbeam, $I_D$ is the density of the departing lightbeam, $c$ is the concentration in moles per liter, and $d$ is the absorption path length in centimeters. $\Sigma$ is the molar extinction coefficient and "log" refers to the common or Briggsian Logarithms.

Among the ultraviolet absorbent compounds we have found especially effective in practicing the invention are the esters of aromatic acids, particularly the esters of substituted benzoic acids and cinnamic acid, and the aromatic ketones in which two aromatic nuclei are attached directly to an oxo-group, as in the derivatives of benzophenone. Examples in the first category are amyl para-dimethylaminobenzoate, glyceryl para-aminobenzoate, and the ethyl, benzyl, and isobutyl esters of cinnamic acid, and in the second category 2-hydroxy-4-(2-hydroxy-3-methacrylyloxy) propoxybenzophenone and 2-hydroxy-4-methoxy-benzophenone-5-sulfonic acid. All of the named compounds are commercially available. Solutions of all of them have little or no staining quality, and their log molar extinction coefficients in the visible (i.e., between 4,000 and 7,000 angstrom units) is below 2.0.

We have also found it advantageous to incorporate in the pyrethroid composition, in addition to the ultraviolet absorbent, a relatively slow-acting antioxidant. We have found particularly adapted for this use those compounds posesssing an hydroxy group attached directly to an aromatic nucleus and containing at least 14 carbon atoms. Two especially effective compounds in this class are 2,6-di-tert. butyl - 4 - methylphenol and 2,6 - dioctadecyl-para-cresol.

We have, further, made the surprising discovery that liquid petrolatum (as defined in the Merck Index, 7th edition, page 788), when used as the solvent for pyrethroids, itself acts as a potent preservative of the said pyrethroids, and that its effect is approximately additive, when such liquid petrolatum solution of the pyrethroids is used in conjunction with ultraviolet absorbents and with antioxidants. When an absorbent and an antioxidant are employed in the composition, each is preferably present in an amount up to about 5%.

In order that the invention may be more readily understood, reference is made to the examples given below. As will be apparent to those skilled in the art, these examples are illustrative only and in no way limit the scope of the invention.

In testing the various additives, solutions were prepared in solvents, such as hexane, kerosene, n-butyl phthalate, ethylene glycol monobutyl ether, isoparaffin (Humble Oil Co. "Isopar M"), and liquid petrolatum. A 2 x 8-inch glass plate was spread with 0.1 ml. of the solution, and the control and test solution plates were then exposed to sunlight for 4 hours. At the end of that time, the residue on the plates was washed off with hexane and the amount of toxicant remaining was determined by gas-liquid chromatography. The GLC analysis was verified by a standard biological assay method. The results are summarized on the tables below. The percentages in the solutions are given on a weight/volume basis.

TABLE I

| Composition—Controls | Percent found | | |
|---|---|---|---|
| | CI* | PI** | AL*** |
| 1 percent pyrethrum extract in hexane | 6 | 2 | |
| 1 percent pyrethrum extract in kerosene | 7 | 4 | |
| 1 percent pyrethrum extract in n-butyl phthalate | 7 | 13 | |
| 1 percent pyrethrum extract in liquid petrolatum | 67 | 59 | |
| 1 percent pyrethrum extract in isoparaffin (Humble Oil Co. "Isopar M") | 34 | 34 | |
| 1 percent pyrethrum extract in 10 percent ethylene glycol monobutyl ether in isoparaffin (Humble Oil Co. "Isopar M") | 6 | 2 | |
| 1 percent pyrethrum extract in 10 percent ethylene glycol monobutyl ether in liquid petrolatum | 66 | 49 | |
| 1 percent allethrin in hexane | | | 4 |

*Cinerin I.
**Pyrethrin II.
***Allethrin.

| Composition | Percent found | | |
|---|---|---|---|
| | CI* | PI** | AL*** |
| 1 percent pyrethrum extract plus 1 percent amyl para-dimethylaminobenzoate in hexane | 47 | 31 | |
| 1 percent pyrethrum extract plus 1 percent amyl para-dimethylaminobenzoate in liquid petrolatum | 77 | 65 | |
| 1 percent pyrethrum extract plus 1 percent glyceryl para-aminobenzoate in hexane | 43 | 20 | |
| 1 percent pyrethrum extract plus 1 percent ethyl cinnamate in hexane | 10 | 16 | |
| 1 percent pyrethrum extract plus 1 percent ethyl cinnamate in 10 percent ethylene glycol monobutyl ether in liquid petrolatum | 62 | 59 | |
| 1 percent pyrethrum extract plus 1 percent ethyl cinnamate in liquid petrolatum | 93 | 72 | |
| 1 percent pyrethrum extract plus 1 percent benzyl cinnamate in 10 percent ethylene glycol monobutyl ether in liquid petrolatum | 79 | 68 | |
| 1 percent pyrethrum extract plus 1 percent benzyl cinnamate in liquid petrolatum | 80 | 71 | |
| 1 percent pyrethrum extract plus 1 percent isobutyl cinnamate in kerosene | 10 | 16 | |
| 1 percent pyrethrum extract plus 1 percent isobutyl cinnamate in n-butyl phthalate | 15 | 31 | |
| 1 percent pyrethrum extract plus 1 percent isobutyl cinnamate in 10 percent ethylene glycol monobutyl ether in liquid petrolatum | 68 | 60 | |
| 1 percent pyrethrum extract plus 1 percent isobutyl cinnamate in liquid petrolatum | 77 | 65 | |
| 1 percent pyrethrum extract plus 1 percent 2-hydroxy-4-(2-hydroxy-3-methacrylyloxy)-propoxybenzophenone in kerosene | 42 | 35 | |
| 1 percent pyrethrum extract plus 1 percent 2-hydroxy-4-(2-hydroxy-3-methacrylyloxy)-propoxybenzophenone in n-butyl phthalate | 11 | 28 | |
| 1 percent pyrethrum extract plus 1 percent (2-hydroxy-4-(2-hydroxy-3-methacrylyloxy)-propoxybenzophenone) in 10 percent ethylene glycol monobutyl ether in liquid petrolatum | 93 | 77 | |
| 1 percent pyrethrum extract plus 1 percent 2-hydroxy-4-methoxy-benzophenone-5-sulfonic acid in n-butyl phthalate | 8 | 27 | |
| 1 percent pyrethrum extract plus 1 percent 2-hydroxy-4-methoxy-benzophenone-5-sulfonic acid in 10 percent ethylene glycol monobutyl ether in liquid petrolatum | 96 | 34 | |
| 1 percent pyrethrum extract plus 1 percent 2,6-di-tert. butyl 4-methylphenol in hexane | 14 | 55 | |
| 1 percent pyrethrum extract plus 1 percent 2,6-dioctadecyl-para-cresol in 10 percent ethylene glycol monobutyl ether in liquid petrolatum | 76 | 63 | |
| 1 percent pyrethrum extract plus 1 percent 2,6-dioctadecyl-para-cresol in liquid petrolatum | 94 | 78 | |
| 1 percent pyrethrum extract plus 1 percent amyl para-dimethylaminobenzoate plus 1 percent 2,6-dioctadecyl-para-cresol in 10 percent ethylene glycol monobutyl ether in liquid petrolatum | 80 | 58 | |
| 1 percent pyrethrum extract plus 1 percent amyl para-dimethylaminobenzoate plus 1 percent 2,6-dioctadecyl-para-cresol in liquid petrolatum | 102 | 83 | |
| 1 percent pyrethrum extract plus 1 percent ethyl cinnamate plus 1 percent 2,6-dioctadecyl-para-cresol in 10 percent ethylene glycol monobutyl ether in liquid petrolatum | 79 | 78 | |
| 1 percent pyrethrum extract plus 1 percent ethyl cinnamate plus 1 percent 2,6-dioctadecyl-para-cresol in liquid petrolatum | 97 | 80 | |
| 1 percent pyrethrum extract plus 1 percent benzyl cinnamate plus 1 percent 2,6-dioctadecyl-para-cresol in 10 percent ethylene glycol monobutyl ether in liquid petrolatum | 93 | 90 | |
| 1 percent pyrethrum extract plus 1 percent benzyl cinnamate plus 1 percent 2,6-dioctadecyl-para-cresol in liquid petrolatum | 103 | 92 | |
| 1 percent pyrethrum extract plus 1 percent isobutyl cinnamate plus 1 percent 2,6-dioctadecyl-para-cresol in 10 percent ethylene glycol monobutyl ether in liquid petrolatum | 72 | 66 | |
| 1 percent pyrethrum extract plus 1 percent isobutyl cinnamate plus 1 percent 2,6-dioctadecyl-para-cresol in liquid petrolatum | 86 | 66 | |
| 1 percent pyrethrum extract plus 1 percent 2-hydroxy-4-(2-hydroxy-3-methacrylyloxy) propoxybenzophenone plus 1 percent 2,6-dioctadecyl-para-cresol in 10 percent dibutyl phthalate in liquid petrolatum | 90 | 94 | |
| 1 percent pyrethrum extract plus 1 percent 2-hydroxy-4-(2-hydroxy-3-methacrylyloxy) propoxybenzophenone plus 1 percent 2,6-dioctadecyl-para-cresol in 10 percent ethylene glycol monobutyl ether in liquid petrolatum | 95 | 96 | |
| 1 percent pyrethrum extract plus 1 percent 2-hydroxy-4-(2-hydroxy-3-methacrylyloxy) propoxybenzophenone plus 1 percent 2,6-dioctadecyl-para-cresol in 10 percent ethylene glycol monobutyl ether in isoparaffin "M" | 96 | 62 | |
| 1 percent pyrethrum extract plus 1 percent 2-hydroxy-4-(2-hydroxy-3-methacrylyloxy) propoxybenzophenone plus 1 percent 2,6-dioctadecyl-para-cresol in 10 percent ethylene glycol monobutyl ether in an isoparaffin (Tidewater Oil Co. "Isoparaffin 450") | 67 | 82 | |
| 1 percent pyrethrum extract plus 1 percent 2-hydroxy-4-(2-hydroxy-3-methacrylyloxy) propoxybenzophenone plus 1 percent 2,6-dioctadecyl-para-cresol in hexyl alcohol | 81 | 71 | |
| 1 percent pyrethrum extract plus 1 percent 2-hydroxy-4-methoxybenzophenone-5-sulfonic acid plus 1 percent 2,6-dioctadecyl-para-cresol in 10 percent ethylene glycol monobutyl ether in liquid petrolatum | 90 | 85 | |
| 1 percent allethrin plus 1 percent 2-hydroxy-4-(2-hydroxy-3-methacrylyloxy) propoxybenzophenone in 10 percent ethylene glycol monobutyl ether in an isoparaffin (Humble Oil Co. "Isopar M") | | | 66 |
| 1 percent allethrin plus 1 percent 2,6-dioctadecyl-para-cresol in 10 percent ethylene glycol monobutyl ether in an isoparaffin (Humbel Oil Co. "Isopar M") | | | 42 |
| 1 percent allethrin plus 1 percent 2-hydroxy-4-(2-hydroxy-3-methacrylyloxy) propoxybenzophenone plus 1 percent 2,6-dioctadecyl-para-cresol in 10 percent ethylene glycol monobutyl ether in an isoparaffin (Humbel Oil Co. "Isopar M") | | | 84 |

* Cinerin I.
** Pyrethrin II.
*** Allethrin.

TABLE III

| Composition | Insect bioassay percent dead after— | |
|---|---|---|
| | 7 days unexposed | Exposed |
| 1 percent pyrethrum extract in hexane (control) | 100 | 10 |
| 1 percent pyrethrum extract plus 1 percent 2-hydroxy-4-(2-hydroxy-3-methacrylyloxy) propoxybenzophenone plus 1 percent 2,6-dioctadecyl-para-cresol in 10 percent ethylene glycol monobutyl ether in liquid petrolatum | 100 | 100 |
| 1 percent pyrethrum extract plus 1 percent amyl para-dimethylaminobenzoate plus 1 percent 2,6-dioctadecyl-para-cresol in 10 percent ethylene glycol monobutyl ether in liquid petrolatum | 100 | 100 |

In the practical application of this invention, the pyrethroid insecticidal compositions, stabilized by means of the above described additives and/or liquid petrolatum solvent will, of course, contain such conventional synergists, solvents, diluents, and the like as may be desired.

Having described our invention, what we now claim is as follows:

1. An insecticidal composition comprising a carrier solvent selected from the group consisting of hexane, kerosene, n-butyl phthalate, ethylene glycol monobutyl ether, isoparaffin, liquid petrolatum, and mixtures thereof in which is incorporated (a) a pyrethroid, (b) a photostable, ultraviolet absorbent compound having a log molar extinction coefficient of not less than about 3.0 in the range of about from 2,900 to 3,200 angstrom units and of not more than about 2.0 in the range of about from 4,000 to 7,000 angstrom units, selected from the group consisting of amyl para-dimethyl-aminobenzoate, glyceryl para-aminobenzoate, ethyl cinnamate, benzyl cinnamate, isobutyl cinnamate, 2-hydroxy-4-(2-hydroxy-3-methacrylyloxy) propoxybenzophenone, and 2-hydroxy-4-methoxy-benzophenone-5-sulfonic acid, and (c) a slow-acting antioxidant compound selected from the group consisting of 2,6-di-tert. butyl 4-methylphenol and 2,6-dioctadecyl-para-cresol, said pyrethroid being present in the insecticidal composition in about 1 percent by weight based on the volume of the composition and each of said ultraviolet absorbent compound and antioxidant compound being present in the insecticidal composition in about from 1 to 5 percent by weight based on the volume of the composition.

2. An insecticidal composition comprising a liquid petrolatum solution of a pyrethroid having incorporated therein (a) a photostable, ultraviolet absorbent compound having a log molar extinction coefficient of not less than about 3.0 in the range of about from 2,900 to 3,200 angstrom units and of not more than about 2.0 in the range of about from 4,000 to 7,000 angstrom units, selected from the group consisting of amyl para-dimethyl-aminobenzoate, glyceryl para-aminobenzoate, ethyl cinnamate, benzyl cinnamate, isobutyl cinnamate, 2-hydroxy-4-(2-hydroxy-3-methacrylyloxy) propoxy-benzophenone, and 2-hydroxy-4-methoxy-benzophenone-5-sulfonic acid, and (b) an antioxidant compound selected from the group consisting of 2,6-di-tert. butyl 4-methylphenol and 2,6-dioctadecyl-para-cresol, said pyrethroid being present in the insecticidal composition in about 1 percent by weight based on the volume of the composition and each of said ultraviolet compound and antioxidant compound being present in the insecticidal composition in an amount of about from 1 to 5 percent by weight based on the volume of the composition.

3. The insecticidal composition of claim 2 wherein the ultraviolet absorbent compound is amyl para-dimethyl-aminobenzoate.

4. The insecticidal composition of claim 2 wherein the ultraviolet absorbent compound is glyceryl para-aminobenzoate.

5. The insecticidal composition of claim 2 wherein the ultraviolet absorbent compound is ethyl cinnamate.

6. The insecticidal composition of claim 2 wherein the ultraviolet absorbent compound is benzyl cinnamate.

7. The insecticidal composition of claim 2 wherein the ultraviolet absorbent compound is isobutyl cinnamate.

8. The insecticidal composition of claim 2 wherein the ultraviolet absorbent compound is 2-hydroxy-4-(2-hydroxy-3-methacrylyloxy) propoxybenzophenone.

9. The insecticidal composition of claim 2 wherein the ultraviolet absorbent compound is 2-hydroxy-4-methoxybenzophenone-5-sulfonic acid.

10. The insecticidal composition of claim 2 wherein the antioxidant is 2,6-di-tert. butyl 4-methylphenol.

11. The insecticidal composition of claim 2 wherein the antioxidant is 2,6-dioctadecyl para-cresol.

12. A method of killing insects comprising contacting the insects with an effective amount of an insecticidal composition of claim 1.

13. A method of killing insects comprising contacting the insects with an effective amount of an insecticidal composition of claim 2.

References Cited

UNITED STATES PATENTS

| 2,011,428 | 8/1935 | Voorhees | 167—24 |
| 2,103,196 | 12/1937 | Knight | 424—194 |
| 2,421,223 | 5/1947 | Smith et al. | 167—24 |
| 2,659,689 | 11/1953 | Schreiber | 167—90 |

OTHER REFERENCES

Giese et al.: J. Amer. Pharm. Assoc., vol. 39, pp. 30–36 (1950).

Das Gupta: J. Soc. Cosm. Chem., vol. 18, pp. 143–147, Mar. 4, 1967.

Sheflan et al.: The Handbook of Solvents, 1953, pp. 165, 260, 431, and 482.

Hadaway et al.: Chem. Abstracts, vol. 53, 3586h.

Chemical Abstracts, vol. 65, 7108b.

Merck Index, 8th ed., Merck & Co., Rahway, N.J.

ALBERT T. MEYERS, Primary Examiner

A. J. ROBINSON, Assistant Examiner

U.S. Cl. X.R.

424—189, 193